(12) United States Patent
Tamura et al.

(10) Patent No.: US 8,477,997 B2
(45) Date of Patent: Jul. 2, 2013

(54) WHITE ROAD LINE RECOGNITION DEVICE FOR VEHICLE

(75) Inventors: Yuichiro Tamura, Tokyo (JP); Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 365 days.

(21) Appl. No.: 12/858,044

(22) Filed: Aug. 17, 2010

(65) Prior Publication Data

US 2011/0052080 A1    Mar. 3, 2011

(30) Foreign Application Priority Data

Aug. 31, 2009  (JP) .................. 2009-200570

(51) Int. Cl.
*G06K 9/00*    (2006.01)
(52) U.S. Cl.
USPC .......................... 382/103; 382/104
(58) Field of Classification Search
USPC ............. 382/103, 104, 105, 106, 108, 199, 382/203, 204, 205, 270; 701/65, 414, 426, 701/428, 429, 460
See application file for complete search history.

(56) References Cited

U.S. PATENT DOCUMENTS

| | | | | |
|---|---|---|---|---|
| 5,362,883 A * | 11/1994 | Jennings et al. | ............ | 548/408 |
| 5,617,487 A * | 4/1997 | Yoneyama et al. | ............ | 382/199 |
| 5,892,855 A * | 4/1999 | Kakinami et al. | ............ | 382/291 |
| 7,925,425 B2 * | 4/2011 | Tomita et al. | ............ | 701/118 |
| 8,131,098 B2 * | 3/2012 | Watanabe et al. | ............ | 382/254 |
| 2003/0103650 A1 * | 6/2003 | Otsuka et al. | ............ | 382/104 |
| 2005/0135658 A1 * | 6/2005 | Yamamoto et al. | ............ | 382/104 |

FOREIGN PATENT DOCUMENTS

JP    11-085999    3/1999

* cited by examiner

*Primary Examiner* — Brian Le
(74) *Attorney, Agent, or Firm* — Smith, Gambrell & Russell, LLP (57) ABSTRACT

In right and left white road line detection regions on a image, a stereo image recognition device of a white road line recognition device for a vehicle detects a pair of a white road line starting point and a white road line ending point for each of retrieval lines set in the horizontal direction based on the change in the luminance on the retrieval lines, calculates a midpoint Pm between each pair of the white road line starting point and white road line ending point, selects a point group with a smaller dispersion between the point group consisting of the white road line starting points and the point group consisting of midpoints based on a predetermined condition, and calculates a white road line based on the selected point group.

2 Claims, 7 Drawing Sheets

EDGE DETECTION DIRECTION
FOR LEFT WHITE ROAD LINE

EDGE DETECTION DIRECTION
FOR RIGHT WHITE ROAD LINE

← EDGE DETECTING DIRECTION
FOR LEFT WHITE ROAD LINE

→ EDGE DETECTING DIRECTION
FOR RIGHT WHITE ROAD LINE

WHITE ROAD LINE RECOGNITION DEVICE FOR VEHICLE

CROSS REFERENCES TO RELATED APPLICATIONS

The present application claims priority from Japanese Patent Application No. 2009-200570 filed on Aug. 31, 2009, and is hereby incorporated by reference in its entirety.

BACKGROUND OF THE INVENTION

1. Field of the Invention

The present invention relates to a white road line recognition device for a vehicle that recognizes a white road line based on an image captured by an onboard camera.

2. Description of the Related Art

For the improvement of vehicle safety, driving support devices have recently been developed that actively support driver's operations. In order to achieve a function such as lane deviation prevention, a driving support device generally recognizes a white road line based on a captured image in front of an own vehicle, etc., and makes an estimation on an own lane based on the captured white road line.

As a technology that recognizes the white road line, for, example, Japanese Unexamined Patent Application Publication No. 1999-85999 (hereunder referred to as "Patent Document 1") discloses a technology that recognizes a white road line of a complicated shape such as multiple white road line (double white road line) that has a solid line for separating lanes and a dashed line for visual guidance. This technology detects in a road image an edge point where luminance changes from dark to light (positive edge point) and an edge point where luminance changes from light to dark (negative edge point) and executes a Hough transform to the positive and negative edge points respectively to a search Hough space corresponding to the positive and negative edge points respectively.

The visual guidance line of the double white road line, which is the inner line thereof, is sometimes comprised of diamond markings that are placed at a specified interval, lying in a dashed line. When this special type of double white road line or the like is recognized, edge points of the visual guidance line (diamond markings) are arranged discontinuously in a different direction from an extending direction of the double white road line. Accordingly, when only the Hough transform is executed to the edge points of the inner visual guidance line upon the recognition of the double white road line or the like, the direction of a resultant line may be different from the extending direction of the actual lane.

On the other hand, as disclosed Patent Document 1, upon the recognition of the double white road line or the like, a line extending along in a proper direction may be obtained for the double white road line with the special visual guidance line or the like by detecting positive edge points and negative edge points for both the inner line and outer line (visual guidance line and lane division line). However, the detection of edge points for the plural lines upon the recognition of the double white road line may excessively increase calculation load.

Accordingly, in view of the above, it is an object of the present invention to provide a white road line recognition device for a vehicle that obtains a stable recognition result even for a multiple white road line or the like without a calculation process such as edge point detection being complicated.

SUMMARY OF THE INVENTION

A white road line recognition device for a vehicle according to an embodiment of the present invention includes white road line border point detecting means that detects a pair of a white road line starting point of and a white road line ending point for each of retrieval lines set in the horizontal direction in a captured image of driving environment of an own vehicle, based on the change in luminance on the retrieval lines; midpoint calculating means that calculates a midpoint of the white road line starting point and the white road line ending point detected on each of the retrieval lines; point group selecting means that selects a point group with a smallest dispersion among at least either of a point group consisting of white road line starting points or a point could consisting of white road line ending points, and a point group consisting of midpoints, according to a predetermined condition; and white road line calculating means that calculates a white road line based on the selected point group.

According to an aspect of the present invention, the white road line recognition device for a vehicle can stably obtain a recognition result for a multiple white road line or the like without a calculation process such as an edge point detection being complicated.

DESCRIPTION OF THE PREFERRED EMBODIMENTS

Figure 1:
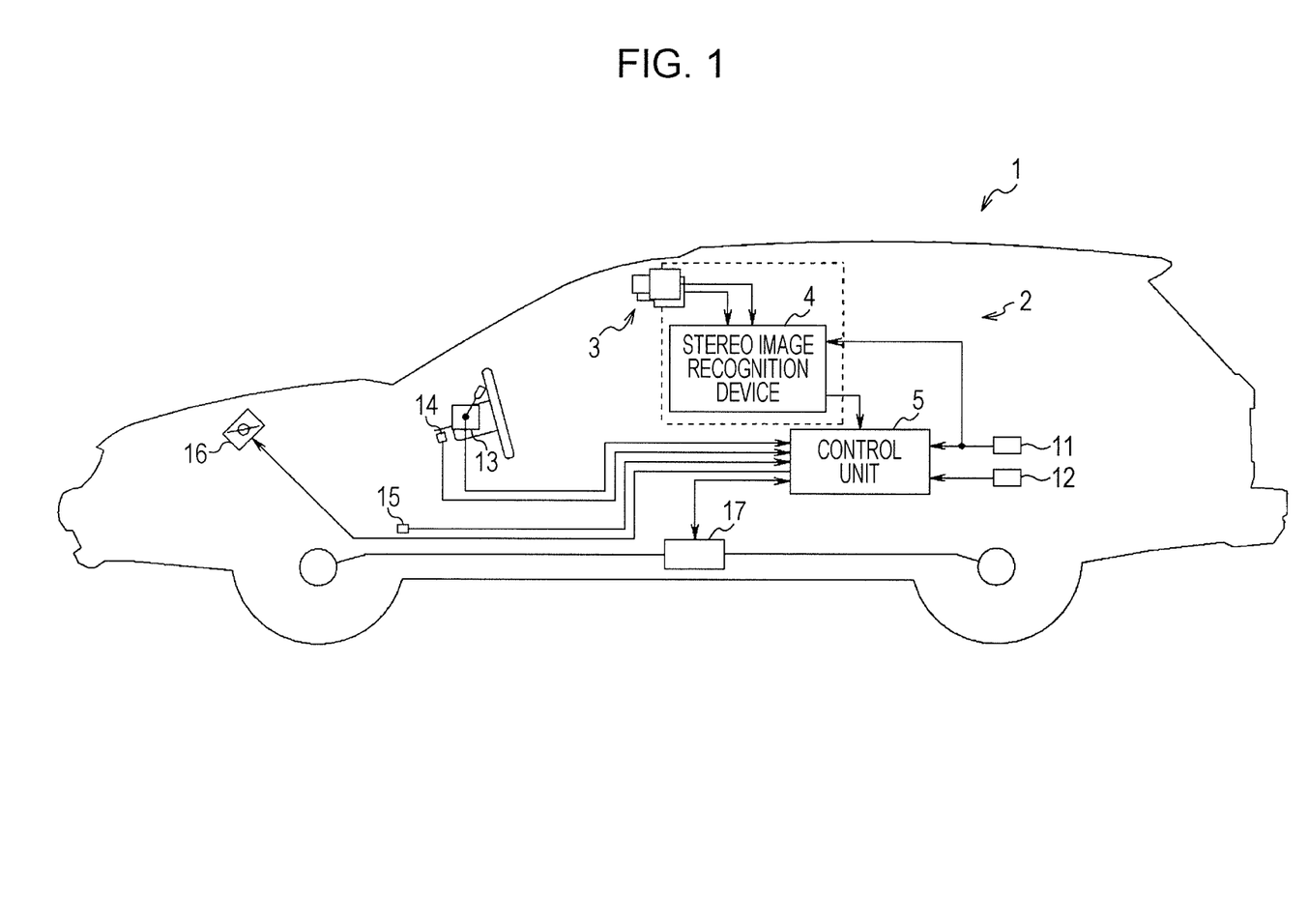
FIG. 1 is a general schematic view illustrating a driving support device for a vehicle according to an embodiment of the present invention.
Figure 2:
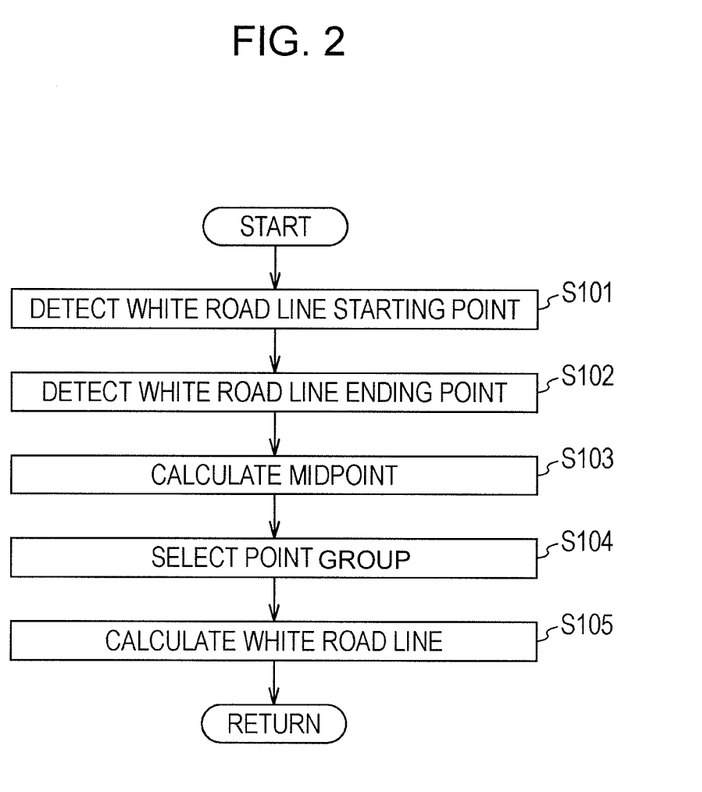
FIG. 2 is a flow chart showing a routine of white road line recognition.
Figure 3:
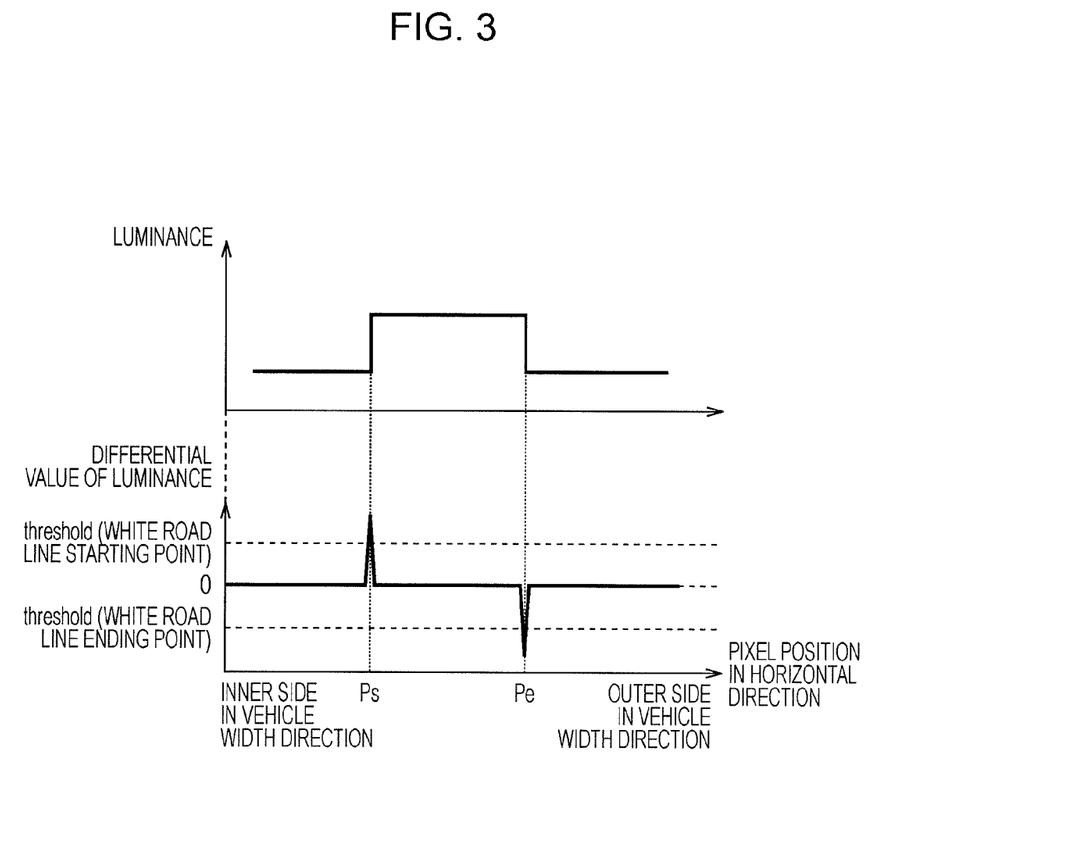
FIG. 3 is a diagram showing a transition of luminance and differential value thereof at a white road line starting point and a white road line ending point.
Figure 4A:
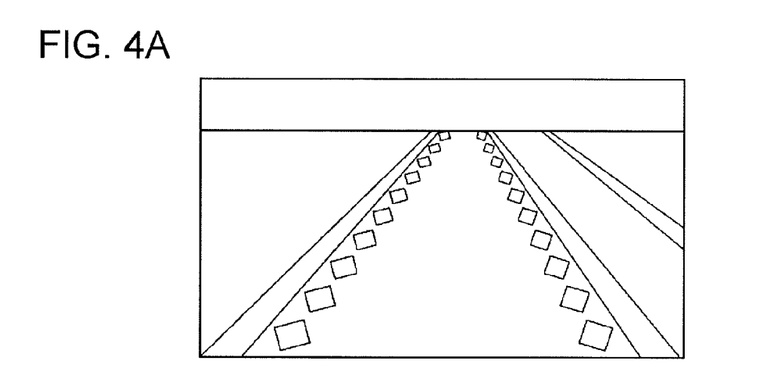
FIG. 4A is an illustrative view showing a frame format of a captured image of a vehicle exterior environment.
Figure 4B:
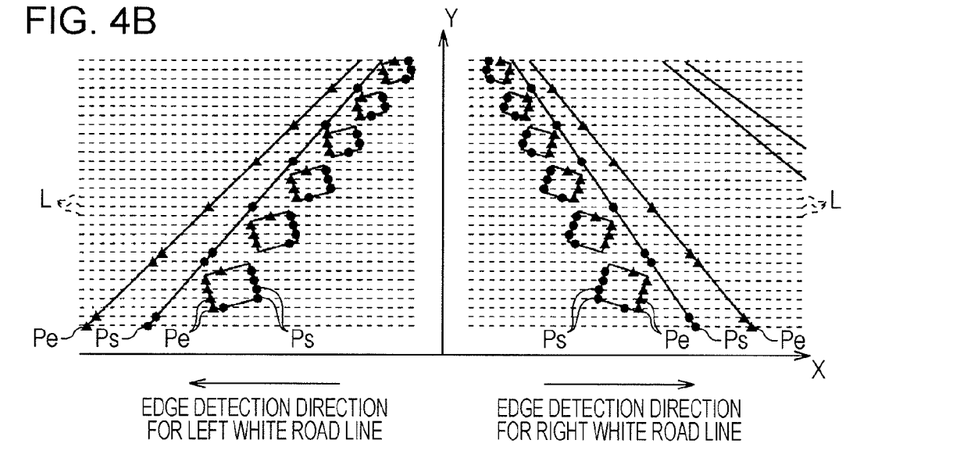
FIG. 4B is an illustrative view showing a white road line starting point and a white road line ending point that are detected from the image of FIG. 4A.
Figure 4C:
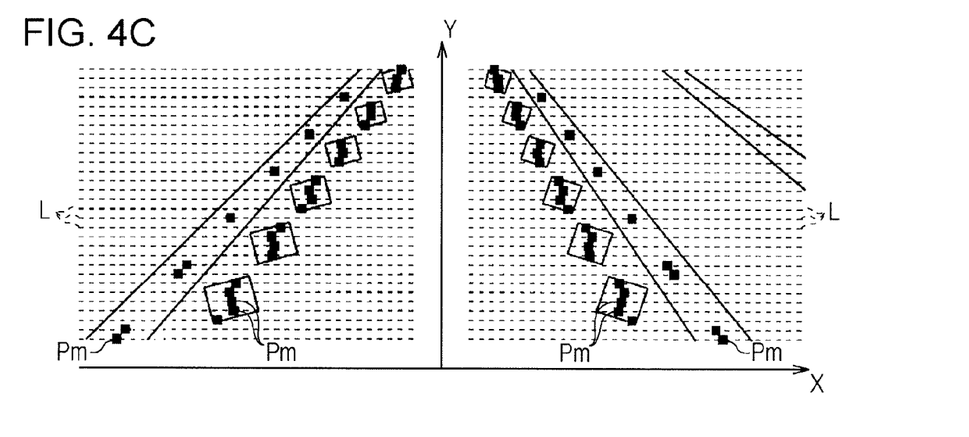
FIG. 4C is an illustrative view showing a midpoint that is calculated based on FIG. 4B.
Figure 5A:
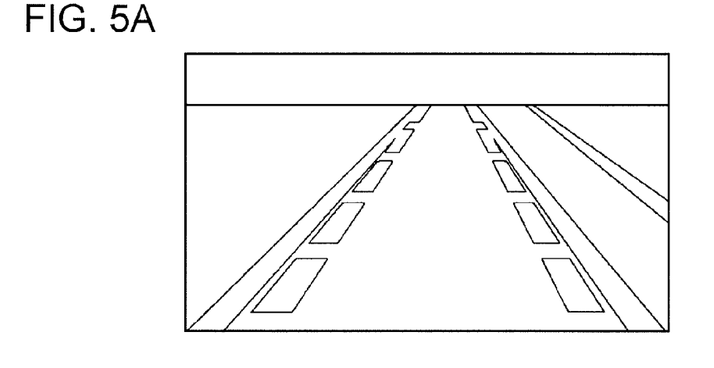
FIG. 5A is an illustrative view showing a frame format of a captured image of an vehicle exterior environment.
Figure 5B:
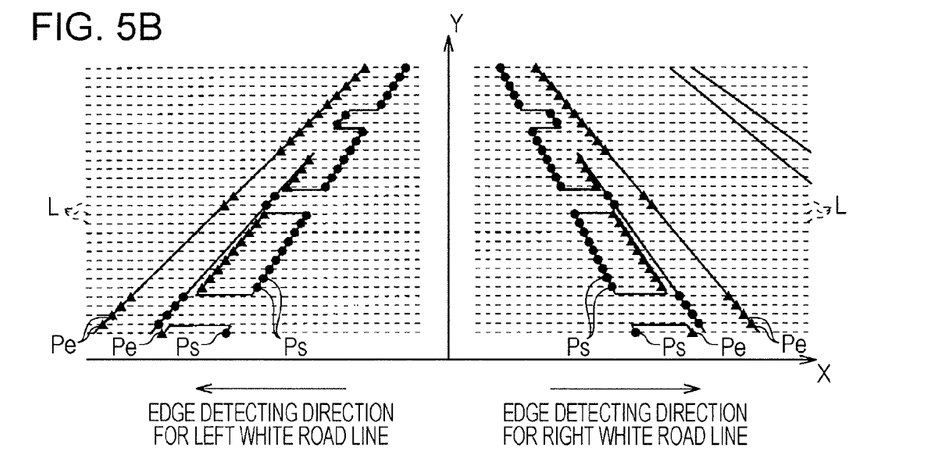
FIG. 5B is an illustrative view showing a white road line starting point and a white road line ending point that are detected from the image of FIG. 5A.
Figure 5C:
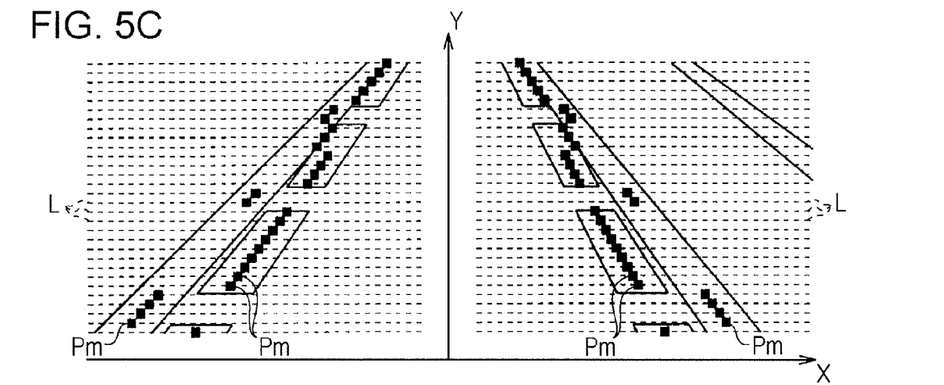
FIG. 5C is an illustrative view showing a midpoint that is calculated based on FIG. 5B.
Figure 6:
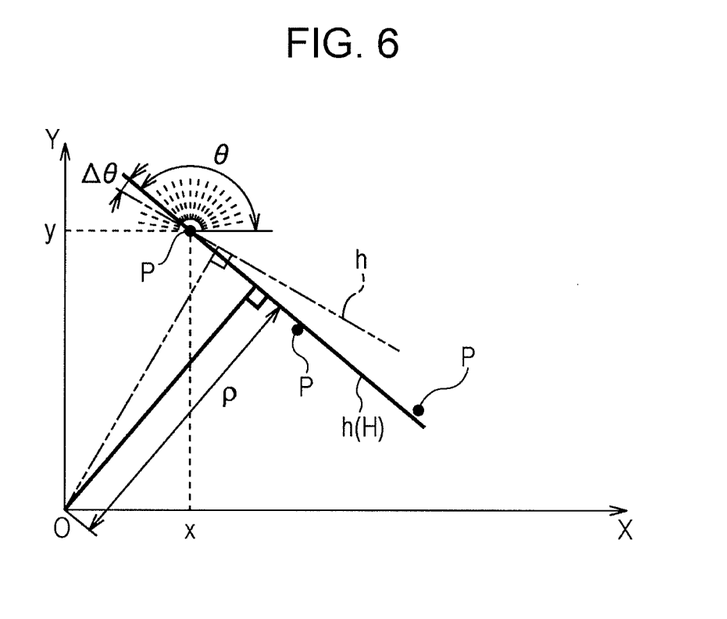
FIG. 6 is an illustrative view showing a calculation method of a Hough transform.
Figure 7:
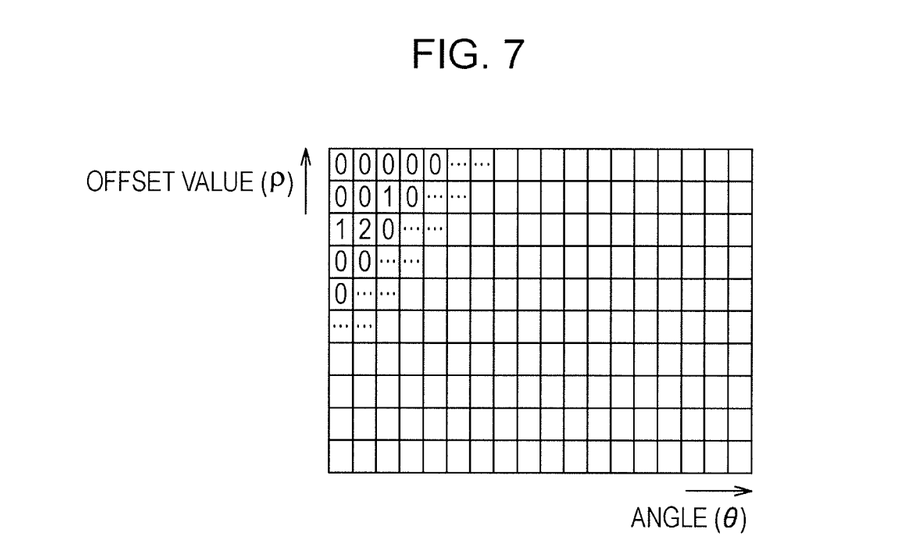
FIG. 7 is an illustrative view showing a Hough space.
Figure 8:
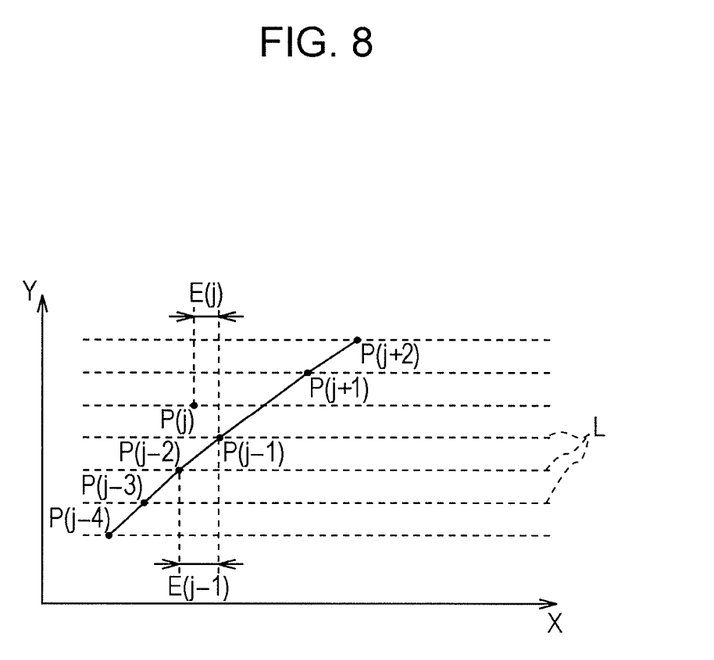
FIG. 8 is an illustrative view showing a modification of a point group selecting method.

An embodiment of the present invention will hereunder be described with reference to the drawings. The drawings relate to an embodiment of the present invention: FIG. 1 is a general schematic view illustrating a driving support device for a vehicle; FIG. 2 is a flow chart showing a routine of white road line recognition; FIG. 3 is a diagram showing a transition of luminance and differential value thereof on a white road line starting point and a white road line ending point; FIG. 4A is an illustrative view showing a frame format of a captured image of a vehicle exterior environment, FIG. 4B is an illustrative view showing a white road line starting point and a white road line ending point that are detected from the image of FIG. 4A, and FIG. 4C is an illustrative view showing a midpoint that is calculated based on FIG. 4B; FIG. 5A is an illustrative view showing a frame format of a captured image of an vehicle exterior environment, FIG. 5B is an illustrative view showing a white road line starting point and a white road line ending point that are detected from the image of FIG. 5A, and FIG. 5C is an illustrative view showing a midpoint that is calculated based on FIG. 5B; FIG. 6 is an illustrative view showing a calculation method of a Hough transform; FIG. 7 is an illustrative view showing a Hough space; and FIG. 8 is an illustrative view showing a modification of a point group selecting method.

In FIG. 1, reference numeral 1 denotes a vehicle or the like (own vehicle), on which a driving support device 2 is mounted. The driving support device 2 mainly includes a stereo camera 3, a stereo image recognition device 4, and a control unit 5, for example.

The own vehicle 1 is provided with a vehicle speed sensor 11 detecting an own vehicle speed V, a yaw rate sensor 12 detecting a yaw rate γ, a main switch 13 switching on and off a driving control function, a steering angle sensor 14 which is installed in pairs with a steering shaft connected a steering wheel and detects a steering angle θst, and a accelerator opening sensor 15 detecting a depression amount of an accelerator pedal by a driver (accelerator opening amount) θacc.

The stereo camera 3 is comprised of a pair of CCD cameras that utilize a solid-state imaging device such as charge-coupled device (CCD) for a stereo optical system. The right and left CCD cameras are mounted in a front ceiling of the own vehicle compartment with a certain spacing, capture a stereo image of an object outside the own vehicle from different viewpoints, and output image data to a stereo image recognition device 4. In a following explanation, one image of a pair of captured stereo images (right image, for example) will be referred to as a reference image, whereas the other image (left image, for example) will be referred to as a comparison image.

The stereo image recognition device 4 firstly divides the reference image into small regions of, for example, 4×4 pixels, and compares the reference image and the comparison image in terms of a luminance or color pattern of each small region in order to find a corresponding region, and obtains a distance distribution over the entire reference image. Further, the stereo image recognition device 4 determines a luminance difference between each pixel of the reference image with adjacent pixels thereof, extracts the luminance differences exceeding a threshold as an edge, and gives distance information to the extracted pixels (edges) to generate a distribution image of the edges having distance information (distance image). Then, based on the generated distance image, the stereo image recognition device 4 assigns a different identification to a white road line, a side wall, and a three-dimensional object or the like in front of the own vehicle and monitors them according to the identification continuously among frames.

In the present embodiment, the white road line is a generic name for lines that extend along on a road for dividing an own lane such as a single lane division line and a multiple line that has a visual guidance line inside the a lane division line (double line, etc.). The form of each line may be a solid line or a dashed line, and further, each line may be yellow, Bott's dots, etc. Moreover, upon white road line recognition according to the present embodiment, even when an actual white road line is a double white line, both right and left lines are respectively recognized by being approximated to a single solid line, a single curved line, etc.

Upon white road line recognition of this type, the stereo image recognition device 4 detects edges on a plurality of retrieval lines L set in the horizontal direction (vehicle width direction) in a white road line detection region, the edges whose luminance changes beyond a prescribed level, so as to detect a pair of a white road line starting point Ps and a white road line ending point Pe for each retrieval line. In other words, in each of the right and left white road line detection regions set in the reference image, the stereo image recognition device 4 detects the edge points by examining the change in luminance of every pixel on each retrieval line L from the inner side to the outer side in the vehicle width direction. Then the stereo image recognition device 4 detects the a pair of a white road line starting point Ps and a white road line ending point Pe on both right and left sides for each retrieval line L. In addition, the stereo image recognition device 4 calculates a midpoint Pm of the white road line starting point Ps and the white road line ending point Pe, which have been detected on each retrieval line L. Further, the stereo image recognition device 4 selects a point group with a smaller dispersion between a point group consisting of the a white road line starting points Ps and a point group consisting of the midpoints Pm according to a predetermined condition, so as to calculate a white road line based on the selected point group.

As described above, in the present embodiment, the stereo image recognition device 4 has a function as a white road line recognition device, while it achieves functions as white road line border point detecting means, midpoint calculating means, point group selecting means and white road line calculating means.

Information on driving environment in front of the own vehicle 1 recognized by the stereo camera recognition device 4 is input to the control unit 5. In addition, the own vehicle speed V from the vehicle speed sensor 11, the yaw rate γ from the yaw rate sensor 12, and the like are input to the control unit 5 as driving information of the own vehicle 1, and an operation signal from the main switch 13, the steering angle θst from the steering angle sensor 14 and the accelerator opening amount θacc from the accelerator opening sensor 15 and the like are input to the control unit 5 as input information on an operation by the driver.

Then, for example, when an execution of an Adaptive Cruise Control (ACC) function, which is one of driving support control functions, is instructed through the operation of the main switch 13 by the driver, the control unit 15 reads a direction of a preceding vehicle recognized by the stereo camera recognition device 4 so as to identify whether or not there is a preceding vehicle to follow on a driving route of the own vehicle.

As a result, when a preceding vehicle to follow is not detected, constant-speed driving control is executed through opening and closing control of a throttle valve 16 (engine output control) so as to maintain the speed of the own vehicle 1, V.

On the other hand, when a preceding vehicle to follow is detected and the speed of the preceding vehicle is equal to or higher than a set vehicle speed, vehicle following control is executed wherein the own vehicle follows the preceding vehicle with a inter-vehicle distance from the preceding vehicle converged to a target inter-vehicle distance. During this vehicle following control, the control unit 5 converges the inter-vehicle distance from the preceding vehicle to the target inter-vehicle basically through opening and closing control of the throttle valve 16 (engine output control). Furthermore, when the control unit 5 determines that sufficient speed reduction is not achieved by the control of the throttle valve 16 only, the control unit 5 uses in combination control of an output fluid pressure from an active booster 17 (automatic braking intervention) to converge the inter-vehicle distance to the target inter-vehicle distance.

In addition, when an execution of a lane deviation prevention function, which is one of driving support control functions, is instructed through the main switch 13 operated by the driver, the control unit 15, for example, sets a warning determination line based on right and left white road lines, which define the own lane, and estimates a driving route of the own vehicle based on the speed V and yaw rate γ of the own vehicle 1. Then, for example, when the control unit 5 determines that the driving route of the own vehicle crosses either of the right and left warning determination lines within a set front distance of the own vehicle (10-16 m, for example), the control unit 5 determines that the own vehicle 1 is highly likely to deviate from the current own lane, and makes a lane deviation warning. Next, white road line recognition of the above-mentioned stereo image recognition device 4 will be described with reference to the flow chart for a routine of white road line recognition shown in FIG. 2.

When this routine begins, in step S101, the stereo image recognition device 4 firstly performs the detection of a white road line starting point, Ps. In other words, for example, in the right and left white road line detection regions set on the reference image, the stereo image recognition device 4 detects an edge on the retrieval lines L from the inner side to the outer side in the vehicle width direction, which is based on a center line of the image (or a direction of movement of the own vehicle that is estimated according to the steering angle θst or the like), and searches an edge point indicating a white road line starting point, Ps. More specifically, as shown in FIG. 3, for example, upon the search from the inner side to the outer side in the vehicle width direction, if a point (edge point) is such that the luminance of a pixel on the outer side in the vehicle width direction is relatively higher than the luminance of a pixel on the inner side and a differential value of the luminance, which shows an amount of change thereof, is equal to or positively exceeds a set threshold, the stereo image recognition device 4 detects the edge point as a white road line starting point, Ps. For fast calculation, upon the search of the retrieval lines L from the inner side to the outer side in the vehicle width direction, Ps, the stereo image recognition device 4 detects, as a white road line starting point, only an edge point which is firstly detected according to the above-mentioned requirements (that is, an edge point detected on the most inner side in the vehicle width direction according to the above-mentioned requirements).

By this search, for example, when a recognition subject is a double white road line and an inner white road line thereof (visual guidance line) is comprised of diamond markings (see FIG. 4A), white road line starting points Ps which are recognized on both right and left sides of the own vehicle are detected mainly based on the inner visual guidance line, and arranged discontinuously in the extending direction of the white road lines (see FIG. 4B). On the other hand, for example, when a recognition subject is a double white road line and an inner white road line thereof (visual guidance line) is a dashed shape (see FIG. 5A), starting points Ps which are recognized on both right and left sides of the own vehicle are detected mainly based on the inner visual guidance line, and mostly arranged continuously in the extending direction of the white road lines (see FIG. 5B).

Then, in step S102, the stereo image recognition device 4 performs the detection of an ending point, Pe. In other words, for example, in right and left white road line detection regions set on the reference image, the stereo image recognition device 4 detects an edge on retrieval lines L from the inner side to the outer side in the vehicle width direction, which is based on a center line of the image (or a traveling direction of the own vehicle that is estimated according to the steering angle θst or the like), and searches an edge point indicating an white road line ending point, Pe. More specifically, as shown in FIG. 3, for example, upon the search from the inner side to the outer side in the vehicle width direction, if a point (edge point) is such that the luminance of a pixel on the outer side in the vehicle width direction is relatively lower than the luminance of a pixel on the inner side and a differential value of the luminance that shows an amount of change thereof is equal to or negatively exceeds a set threshold, the stereo image recognition device 4 detects the edge point as a white road line ending point, Ps. For fast calculation, upon the search of the retrieval lines L from the inner side to the outer side in the vehicle width direction, the stereo image recognition device 4 detects, as a white road line ending point, Pe, only an edge point which is firstly detected according to the above-mentioned requirements (that is, an edge point detected on the most inner side in the vehicle width direction according to the above-mentioned requirements).

By this search, for example, when a recognition subject is a double white road line and an inner white road line thereof (visual guidance line) is comprised of diamond markings (see FIG. 4A), whir road line ending points Pe which are recognized on both right and left sides of the own vehicle are mainly based on the inner visual guidance line and arranged discontinuously in the extending direction of the white road lines (see FIG. 4B). On the other hand, for example, when a recognition subject is a double white road line and an inner white road line thereof (visual guidance line) is a dashed shape (see FIG. 5A), ending points Pe which are recognized on both right and left sides of the own vehicle are mainly based on the inner visual guidance line and mostly arranged continuously in the extending direction of the white road lines (see FIG. 5B). Note that in the example shown in FIG. 5A, inner and outer lines of the white road lines are bound together in a far distance due to a resolution. Consequently, white road line ending points beyond a certain distance are detected based on the outer line of the double white road lines (lane division line) and arranged continuously in the extending direction of the white road lines, in a position relatively shifted by a certain amount to the outer side in the vehicle width direction (see FIG. 5B).

In this embodiment, distance information is given to white road line the starting points and white road line ending points detected in steps S101 and S102. Alternatively, the distance information for the white road line starting points and ending points may be directly obtained by detecting the white road line starting points and ending points on the distance image instead of the reference image.

Then, in step S103, the stereo image recognition device 4 performs the calculation of a midpoint Pm for the pair of the white road line starting point Ps and a white road line ending point Pe detected on each retrieval line L. More specifically, the stereo image recognition device 4 calculates a width of the white road line on each retrieval line L, based on the number of the pixels from the white road line starting point Ps to the white road line ending point Pe (and distance information). After that, the stereo image recognition device 4 outputs a point that bisects the width of the white road line as the midpoint Pm.

In this case, regarding the double white road lines shown in FIG. 4A, since most of the white road line starting points Ps and white road line ending points Pe are detected based on the inner visual guidance lines, most of the calculated midpoints Pm are arranged continuously in the extending direction of the white road lines (see FIG. 4C). Regarding the double white road lines shown in FIG. 5A, on the other hand, since most of the white road line starting points Ps are detected based on the inner visual guidance lines, and some of white road line ending points Pe are detected based the outer lines (lane division lines), the calculated midpoints Pm are arranged discontinuously, especially in near and far distances of the own vehicle (see FIG. 5C).

Then, in step S104, for example, the stereo image recognition device 4 assess a point group consisting of the white road line starting points Ps and a point group consisting of the midpoints Pm, and selects the point group with a smaller dispersion based on a predetermined condition. Specifically, in this embodiment, the stereo image recognition device 4 obtains an approximation formula that expresses a point group (linear approximation formula, for example) using a Hough transform, and selects the point group where errors of the points to the obtained approximation formula are smaller for white road line calculation.

A more detailed description will be made below using P, which is an abbreviation for the white road line starting point Ps and midpoint Pm. FIG. 6 is an example of the selection of the point group. For each point P consisting of the point group, the stereo image recognition device 4 changes the slope θ of a line h that passes at the point P (x, y) from 0 to 180° by a predetermined angle Δθ to obtain a distance ρ from the origin O to the line h (length of the perpendicular length) for each θ, according to the following expression (1).

$$\rho = x \cdot \cos\theta + y \cdot \sin\theta \quad (1)$$

Then the stereo image recognition device 4, for example, votes (projects) the obtained relationship between θ and ρ of each point P to the corresponding point on a Hough plane (θ, ρ) shown in FIG. 7 as frequency. Furthermore, the stereo image recognition device 4 extracts a combination of θ and ρ that has the largest frequency on the Hough plane (θ, ρ), and sets the line defined by the expression (1) with the extracted θ and ρ (Hough line H) as an approximation formula for the point groups.

Then the stereo image recognition device 4 calculates the average value of the errors of the points P to the approximation formula (Hough line H) and selects the point group that has a smaller average of the calculated errors for white road line calculation.

As a result of the above process, for example, regarding the double white road lines shown in FIG. 4A, the point group consisting of the midpoints Pm is selected for white road line calculation in the white road line detection region on both right and left sides. On the other hand, for another example, regarding the double white road lines shown in FIG. 5A, the point group consisting of the white road line starting points Ps is selected for white road line calculation in the white road line detection region on both right and left sides.

To simplify the selection process of the point group, for example, the maximum (peak) values of the frequencies on the Hough plane (θ, ρ) corresponding to selectable point groups may be compared whereby a point group that has the largest peak is selected for white road line calculation.

Then in step S105, the stereo image recognition device 4 calculates the white road line based on the point group selected in step S104. Specifically, in the present embodiment, for example, when a point group consisting of white road line starting points Ps is selected for white road line calculation, the stereo image recognition device 4 simply sets the Hough line H based on the selected point group as a white road line that divides the own line. On the other hand, for another example, when a point group consisting of midpoints Pm is selected for white road line calculation, the stereo image recognition device 4 shifts the Hough line H based on the selected point group to the inner side in the vehicle width direction by the half value of the distance from the white road line starting point Ps to the white road line ending point Pe and sets the resultant line as a white road line that divides the own line.

According to this embodiment, in the white road line detection region on the right and left sides, a pair of a white road line starting point Ps and a white road line ending point Pe for each of retrieval lines L set in the horizontal direction are detected based on the change in luminance of the retrieval lines L, a midpoint is calculated for each of the pairs of a white road line starting point Ps and a white road line ending point Pe. Then, between the point group consisting of the white road line starting points Ps and the point group consisting of the midpoints Pm, the point group with a smaller dispersion is selected and a white road line is calculated based on the selected point group. Therefore, even in case of a multiple white road line, a stable recognition result can be obtained without a calculation process such as edge detection being complicated.

Specifically, between the point group of the white road line starting points Ps obtained by actual edge detection and the point group of the midpoints Pm between the white road line starting points Ps and the white road line ending points Pe, the more suitable point group is selected to calculate the white road line. Therefore, a favorable recognition result can be obtained even for a special double white road line whose inner line (e.g. visual guidance line) is composed of diamond marks or the like, as shown in FIG. 4A, as well as a white road line whose inner and outer lines are bound together in a far distance on an image, as shown in FIG. 5A.

In this case, the point group more suitable for white road line calculation is accurately selected by evaluating the dispersion of point groups based on a Hough line that is approximated by the Hough transform.

In step S104 according to the above embodiment, the Hough line is used for point group selection, but the invention is not limited to this. For example, the dispersion of a point group may be evaluated based on the displacement in the vehicle width direction of points composing the point group for back and forth shifting.

In this case, as shown in FIG. 8 for example, regarding a point P(j), a point P(j−2) on a retrieval line L, which is two-line ahead of the line where the point P(j) is located (closer to the own vehicle by two lines), and a point P(j−1) on a retrieval line L, which is one-line ahead of the line where the point P(j) is located (closer to the own vehicle by one line) are considered. An amount of change along the X axis between the point P(j−2) and the point P(j−1) on the image, E(j−1), is compared with an amount of change along the X axis between the point P(j−1) and the point P(j), E(j). If the signs of the amounts of change E(j−1) and E(j) are different, the corresponding amount of change E(j) is extracted, integrated as the deviation of the point group, and then divided by the number of the points in the point group to obtain the average of the deviation. The averages of the deviation of the point groups obtained by the above calculation are compared and the point group with a smallest average of deviation can be selected as the point group with a smallest dispersion. This technique dramatically reduces the calculation load for point group selection compared to the above-mentioned process using the Hough transform.

The point group with a smallest dispersion can also be selected by, for example, obtaining an approximation formula expressing the point groups using a least-square method and selecting a point group with a smallest variation or a point group with a largest correlation coefficient as the point group with a smallest dispersion. In this case, for example, point groups are approximated with a quadratic expression ($y = a \cdot x^2 + b \cdot x + c$), and a point group which has a smallest variation or a largest correlation coefficient on the image or in real space can be selected as the point group with a smallest dispersion. This technique dramatically reduces the calculation load for point group selection compared to the above-mentioned process using the Hough transform.

In the above embodiment, the description is made for a case where the point group with a smaller dispersion is selected for white road line calculation between the point group consisting of white road line stating points Ps and the point group consisting of white road line ending points Pm. The present invention is not limited to this: a combination of at least either of the point group consisting of white road line starting points Ps or the point could consisting of white road line ending points Pe, and the point group consisting of midpoints Pm can be set as selectable point groups for white road line calculation. In other words, for example, the point group consisting of white road line starting points Ps, the point could consisting of white road line ending points Pe, and the point group consisting of midpoints Pm may be set and the point group with a smallest dispersion may be selected among these for white road line calculation. Alternatively, the point could consisting of white road line ending points Pe and the point group consisting of midpoints Pm may be set as selectable point groups for white road line calculation and the point group with a smaller dispersion may be selected between these for white road line calculation.

Moreover, in the above embodiment, the description is made for a case where white road line recognition is performed based on a pair of captured stereo images, but of course the present invention is not limited to this and white road line recognition may be performed based on an image captured by a monocular camera.

What is claimed is:

1. A white road line recognition device for a vehicle comprising:
    white road line border point detecting means that detects a pair of white road line edge points that includes a white road line starting point and a white road line ending point on a plurality of retrieval lines set in the horizontal direction in a captured image of a driving environment of an own vehicle, based on a change in luminance on the retrieval lines;
    midpoint calculating means that calculates a midpoint between the white road line starting point and the white road line ending point detected on the retrieval lines;
    point group selecting means that selects a point group, as the point group having the smallest dispersion, from among: at least either of a point group consisting of the white road line starting points, or a point group consisting of the white road line ending points; and a point group consisting of the midpoints, according to a predetermined condition; and
    white road line calculating means that calculates a white road line based on the selected point group,
    wherein the point group selecting means obtains an approximation formula which expresses the point groups using a Hough transform, compares a peak value of frequency on the Hough plane obtained by the calculation among the point groups, and selects a point group that has the largest peak as the point group with a smallest dispersion.

2. A white road line recognition device for a vehicle comprising:
    white road line border point detecting means that detects a pair of white road line edge points that includes a white road line starting point and a white road line ending point on a plurality of retrieval lines set in the horizontal direction in a captured image of a driving environment of an own vehicle, based on a change in luminance on the retrieval lines;
    midpoint calculating means that calculates a midpoint between the white road line starting point and the white road line ending point detected on the retrieval lines;
    point group selecting means that selects a point group, as the point group having the smallest dispersion, from among at least either of a point group consisting of the white road line starting points, or a point group consisting of the white road line ending points; and a point group consisting of the midpoints, according to a predetermined condition; and
    white road line calculating means that calculates a white road line based on the selected point group, wherein
    the point group selecting means selects the point group with a smallest dispersion based on a back and forth shifting analysis of the positional displacement, along the retrieval lines in the vehicle width direction, of points in the individual point groups,
    the point group selecting means selects the point group with a smallest dispersion, based on the back and forth shifting analysis, by calculating an average deviation in the individual point groups; comparing the average deviation of the individual point groups with one another;
    and selecting the point group with the smallest average deviation as the point group with the smallest dispersion, and
    the point group selecting means calculates the average deviation of a point group by comparing the positional displacement, along the retrieval lines in the vehicle width direction, between sequential pairs of points in the point group in the vehicle travelling direction; detecting deviations in the positional displacement between sequential pairs of points in the point group;
    calculating a deviation of the point group based on the detected deviations; and
    dividing the deviation of the point group by the number of points in the point group.

* * * * *